US007549833B2

(12) United States Patent  (10) Patent No.: US 7,549,833 B2
Tang  (45) Date of Patent: Jun. 23, 2009

(54) UNSTACKING APPARATUS AND METHOD FOR PLACING A SHEET OF GLASS FROM AN UPRIGHT GLASS STACK INTO A TILTABLE GLASS FRAME

(75) Inventor: David Tang, 9707 63 Rd., Suite 2C, Rego Park, NY (US) 11374

(73) Assignee: David Tang, Raleigh, NC (US)

( * ) Notice: Subject to any disclaimer, the term of this patent is extended or adjusted under 35 U.S.C. 154(b) by 234 days.

(21) Appl. No.: 11/417,845

(22) Filed: May 4, 2006

(65) Prior Publication Data
US 2007/0258804 A1 Nov. 8, 2007

(51) Int. Cl.
*B65G 59/02* (2006.01)
*B65G 1/133* (2006.01)
*B66C 1/00* (2006.01)
*B66C 3/00* (2006.01)

(52) U.S. Cl. .................... 414/797; 414/737; 414/752.1; 901/6

(58) Field of Classification Search .............. 414/744.1, 414/752.1, 753.1, 749.6, 751.1, 794.8, 793, 414/797, 737, 738, 739, 740, 741, 560, 561; 271/107, 94; 901/8, 6
See application file for complete search history.

(56) References Cited

U.S. PATENT DOCUMENTS

| 1,946,356 | A | * | 2/1934 | Owen | 225/96.5 |
|---|---|---|---|---|---|
| 1,959,216 | A | * | 5/1934 | Owen | 212/291 |
| 3,126,108 | A | * | 3/1964 | Langhart | 414/798.9 |
| 3,690,477 | A | * | 9/1972 | Nilsson | 414/798.9 |
| 3,770,140 | A | * | 11/1973 | Dukette | 414/627 |
| 3,790,003 | A | * | 2/1974 | Tausheck | 414/494 |
| 3,884,368 | A | * | 5/1975 | Ballard | 414/797 |
| 4,053,062 | A | * | 10/1977 | Travis | 29/726.5 |
| 4,395,180 | A | * | 7/1983 | Magnotte | 414/282 |
| 4,420,361 | A | * | 12/1983 | Valimont et al. | 156/556 |
| 4,757,608 | A | * | 7/1988 | Ochi | 29/787 |
| 4,804,173 | A | * | 2/1989 | Pol et al. | 271/11 |

* cited by examiner

*Primary Examiner*—Gregory W Adams

(57) ABSTRACT

An apparatus and method for automatically placing a sheet of glass in a glass frame. The apparatus includes a frame, a carriage, a first gripper, and a second gripper. The carriage is movably mounted to the frame to automatically move between a first position where the carriage is by a stack of glass sheets on a glass rack to a second position where the carriage is by the glass frame. The first gripper is movably mounted to the carriage and moves relative to the carriage to automatically engage the sheet of glass from the stack of glass sheets on the glass rack at the first position of the carriage and to automatically release the sheet of glass at the second position of the carriage. The second gripper automatically engages the sheet of glass when the first gripper automatically releases the sheet of glass at the second position of the carriage, and then automatically places the sheet of glass in the glass frame.

11 Claims, 6 Drawing Sheets

UNSTACKING APPARATUS AND METHOD FOR PLACING A SHEET OF GLASS FROM AN UPRIGHT GLASS STACK INTO A TILTABLE GLASS FRAME

1. BACKGROUND OF THE INVENTION

A. Field of the Invention

The present invention relates to an apparatus and method for placing a sheet of glass in a glass frame, and more particularly, the present invention relates to an apparatus and method for automatically placing a sheet of glass in a glass frame.

B. Description of the Prior Art

Numerous innovations for automatic part moving devices have been provided in the prior art that will be described below. Even though these innovations may be suitable for the specific individual purposes to which they address, they each differ in structure, and/or operation, and/or purpose from the present invention, in that they do not teach an apparatus and method for automatically placing a sheet of glass in a glass frame.

(1) U.S. Pat. No. 4,941,374 to Focke.

U.S. Pat. No. 4,941,374 issued to Focke on Jul. 17, 1990 in class 83 and subclass 13 teaches that in loading of pallets with cartons arranged in layers, intermediate layers including paper or the like frequently have to be introduced between the carton layers. The pallets are loaded by a palletizer, which is known for these purposes, and which has a pivotable and multiply bendable cantilever arm. The intermediate layers are laid onto the carton layers by this cantilever arm with a suction holder. At the same time, portions of a continuous web of material running off from a reel are drawn onto the completed carton layer and then severed to the correct size from the web of material.

(2) U.S. Pat. No. 4,978,275 to Reid et al.

U.S. Pat. No. 4,978,275 issued to Reid et al. on Dec. 18, 1990 in class 414 and subclass 789 teaches a palletizer for receiving successive groups of articles in a pattern forming area and transferring the groups in succession to a stacking area on a pallet. A servo-controlled sweep system transfers article groups from the pattern forming to the stacking area for stacking one group on top of the other as the pallet is indexed downward by a hoist system after each successive group. A carriage system interleaves separator sheets between successive groups. A programmable logic controller controls the servo-controlled sweep system in accordance with a velocity characteristic designed to increase machine speed and efficiency.

(3) U.S. Pat. No. 5,098,254 to Becicka et al.

U.S. Pat. No. 5,098,254 issued to Becicka et al. on Mar. 24, 1992 in class 414 and subclass 792.9 teaches a robotic palletizer including a vertical column, a telescoping horizontal arm mounted for vertical movement along the column, and a hand assembly mounted at the end of the horizontal arm. A pair of photodetectors—movable with the hand assembly—sense the presence and location of cartons in place on a pallet being loaded and signal the palletizer when the vertical height and horizontal extension of the hand assembly are sufficient to place cartons in the proper position for loading onto the pallet. A circuit controls operation of the palletizer in accordance with the sizes and shapes of the cartons and pallets and permits limited variation of the loading pattern provided by the palletizer. Separate conveyors transport cartons to the palletizer for loading and remove loaded pallets from the palletizer upon completion of the loading cycle.

(4) U.S. Pat. No. 5,507,616 to Perobelli et al.

U.S. Pat. No. 5,507,616 issued to Perobelli et al. on Apr. 16, 1996 in class 414 and subclass 789.5 teaches palletization of packs of sheets, books, or the like being carried out through the conveyance of the packs by a roller assembly formed by powered rollers in a programmed way stopping certain rollers beneath those packs that are to be stopped in a programmed position and through the transfer and the putting down of the first row of packs on a palletization stand together with the picking up and the putting down of a separating sheet on every complete layer of packs formed on the palletization stand.

It is apparent that numerous innovations for automatic part moving devices have been provided in the prior art that are adapted to be used. Furthermore, even though these innovations may be suitable for the specific individual purposes to which they address, they would not be suitable for the purposes of the present invention as heretofore described, namely, an apparatus and method for automatically placing a sheet of glass in a glass frame.

2. SUMMARY OF THE INVENTION

Thus, an object of the present invention is to provide an apparatus and method for automatically placing a sheet of glass in a glass frame that avoids the disadvantages of the prior art.

Briefly stated, another object of the present invention is to provide an apparatus and method for automatically placing a sheet of glass in a glass frame. The apparatus includes a frame, a carriage, a first gripper, and a second gripper. The carriage is movably mounted to the frame to automatically move between a first position where the carriage is by a stack of glass sheets on a glass rack to a second position where the carriage is by the glass frame. The first gripper is movably mounted to the carriage and moves relative to the carriage to automatically engage the sheet of glass from the stack of glass sheets on the glass rack at the first position of the carriage and to automatically release the sheet of glass at the second position of the carriage. The second gripper automatically engages the sheet of glass when the first gripper automatically releases the sheet of glass at the second position of the carriage, and then automatically places the sheet of glass in the glass frame.

The novel features which are considered characteristic of the present invention are set forth in the appended claims. The invention itself, however, both as to its construction and its method of operation together with additional objects and advantages thereof will be best understood from the following description of the specific embodiments when read and understood in connection with the accompanying drawing.

3. BRIEF DESCRIPTION OF THE DRAWING

The figures of the drawing are briefly described as follows.

4. LIST OF REFERENCE NUMERALS UTILIZED IN THE DRAWING

Figure 1:
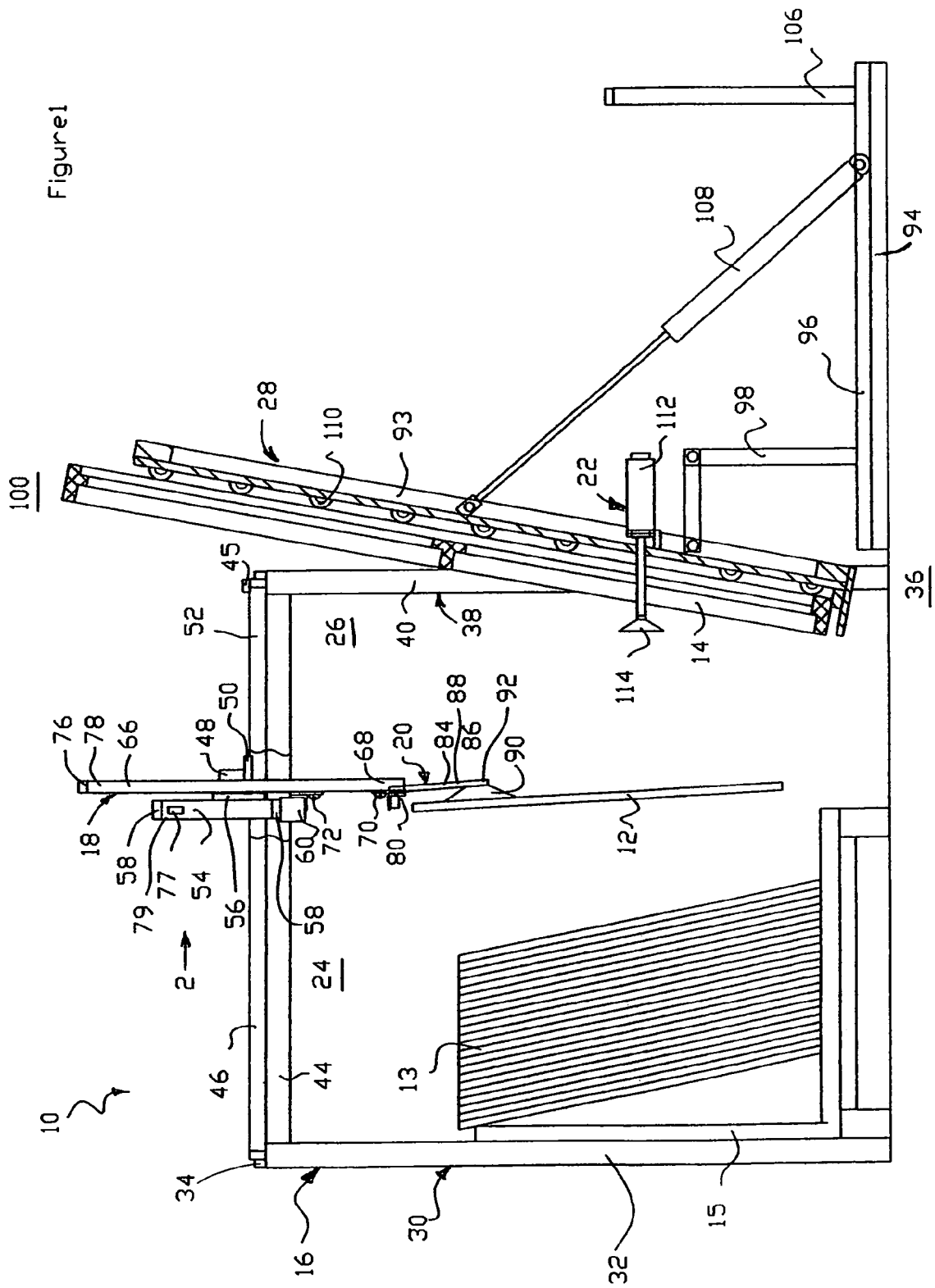
FIG. 1 is a diagrammatic side elevational view of the apparatus of the present invention automatically carrying a sheet of glass in the process of being automatically placed in a glass frame.

A. General.
10 apparatus of present invention for automatically placing sheet of glass 12 in glass frame 14
12 sheet of glass
13 stack of glass sheets on glass rack 15
14 glass frame
15 glass rack
16 frame
18 carriage
20 first gripper
22 second gripper
24 first position of carriage 18
26 second position of carriage 18
28 table B. Frame 16.
30 initial inverted U-shaped member of frame 16
32 pair of uprights of initial inverted U-shaped member 30 of frame 16
34 overhead transverse cross member of initial inverted U-shaped member 30 of frame 16
36 floor
38 terminal inverted U-shaped member of frame 16
40 pair of uprights of terminal inverted U-shaped member 38 of frame 16
42 overhead transverse cross member of terminal inverted U-shaped member 38 of frame 16
44 pair of overhead axial cross members 44 of frame 16
45 pair of dampers of frame 16

C. Carriage 18.
46 pair of tracks of carriage 18
48 bridge of carriage 18
50 first pair of sliders of carriage 18
52 first pair of slave cylinders of carriage 18
54 second pair of slave cylinders of carriage 18
56 second pair of sliders of carriage 18
58 first pair of spacer bars of carriage 18
60 upper extension bar of carriage 18
62 first screws of carriage 18
64 ends of lower one of pair of spacer bars 58 of carriage 18
66 pair of height-adjusting bars of carriage 18
68 lower ends of pair of height-adjusting bars 66 of carriage 18
69 ends of upper extension bar 60 of carriage 18
70 second screws of carriage 18
72 third screws of carriage 18
74 slots in pair of height-adjusting bars 66 of carriage 18
76 second spacer bar of carriage 18
77 pair of limit sensors of carriage 18
78 upper ends of pair of height-adjusting bars 66 of carriage 18, respectively
79 opposite extremes of second pair of slave cylinders 54 of carriage 18

D. First Gripper 20.
80 lower extension bar of first gripper 20
84 pair of arms of first gripper 20
86 mounting bar of first gripper 20
88 lower ends of pair of arms 84 of first gripper 20
90 two first pair of suction cups of first gripper 20
91 first sensor of first gripper 20
92 ends of mounting bar 86 of first gripper 20

E. Table 28.
93 peripheral frame of table 28
94 sub-frame of table 28
96 base of sub-frame 94 of table 28
98 pair of folding legs of sub-frame 94 of table 28
100 first position of table 28
102 glassed frame
104 second position of table 28
106 pair of rigid legs of sub-frame 94 of table 28
108 third slave cylinder of table 28
110 conveyor rollers of table 28

F. Second Gripper 22.
112 fourth pair of slave cylinders of second gripper 22
114 second pair of suction cups of second gripper 22

5. DETAILED DESCRIPTION OF THE PREFERRED EMBODIMENT

A. General

Referring now to the figures, in which like numerals indicate like parts, and particularly to FIGS. 1-4, which are, respectively, a diagrammatic side elevational view of the apparatus of the present invention automatically carrying a sheet of glass in the process of being automatically placed in a glass frame, a diagrammatic end view taken generally in the direction of ARROW 2 in FIG. 1, a diagrammatic side elevational view of the apparatus of the present invention automatically carrying a sheet of glass and starting to automatically place the sheet of glass in the glass frame so as to form a glassed frame, wherein the frame is a door frame, and a diagrammatic side elevational view of the apparatus of the present invention automatically carrying a sheet of glass and starting to automatically place the sheet of glass in the glass frame so as to form the glassed frame, wherein the frame is a door sash, the apparatus of the present invention is shown generally at 10 for automatically placing a sheet of glass 12 in a glass frame 14.

Figure 2:
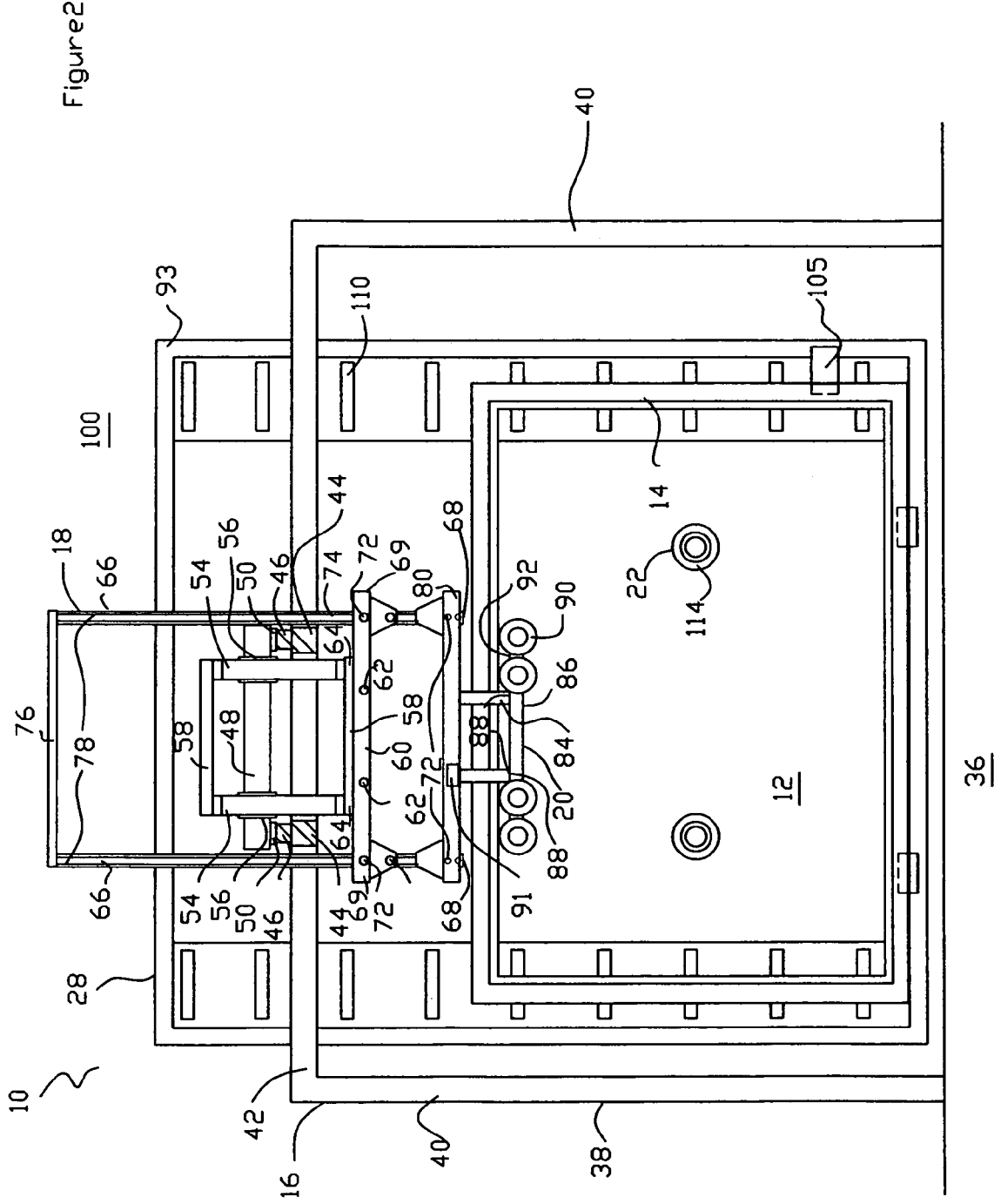
FIG. 2 is a diagrammatic end view taken generally in the direction of ARROW2 in FIG. 1.
Figure 3:
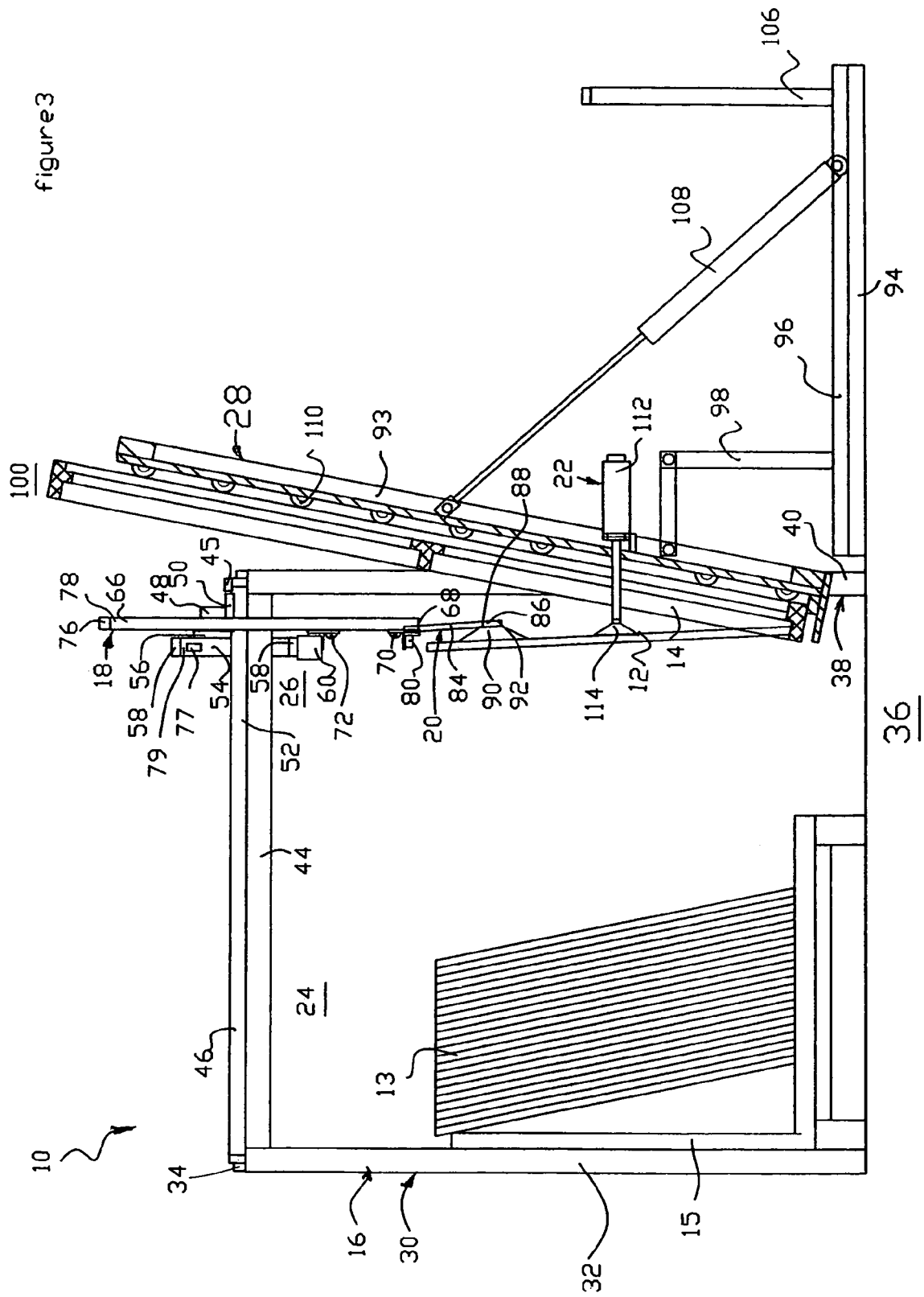
FIG. 3 is a diagrammatic side elevational view of the apparatus of the present invention automatically carrying a sheet of glass and starting to automatically place the sheet of glass in the glass frame so as to form a glassed frame, wherein the frame is a door frame.
Figure 4:
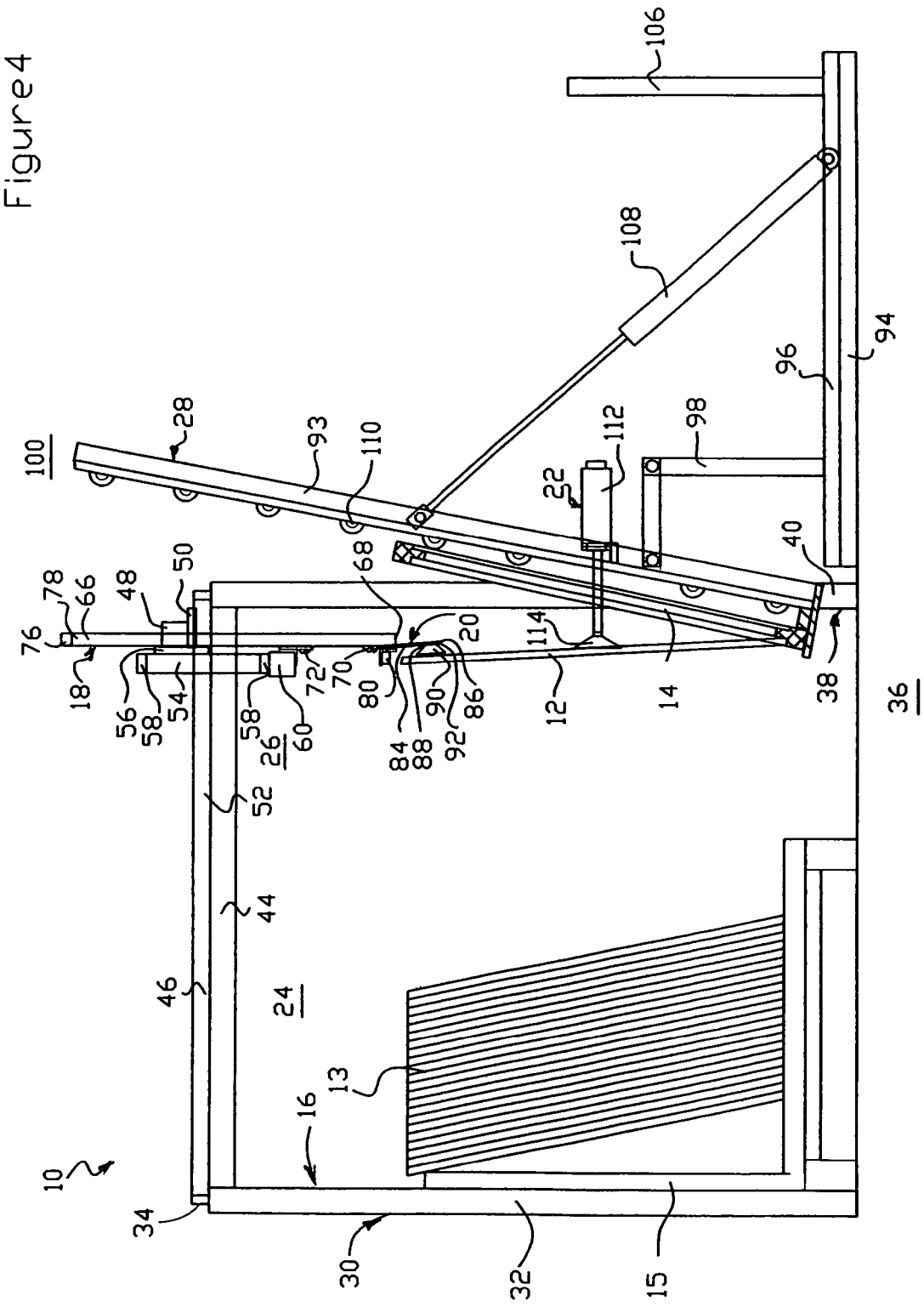
FIG. 4 is a diagrammatic side elevational view of the apparatus of the present invention automatically carrying a sheet of glass and starting to automatically place the sheet of glass in the glass frame so as to form a glassed frame, wherein the frame is a door sash.

The apparatus 10 comprises a frame 16, a carriage 18, a first gripper 20, and a second gripper 22. The carriage 18 is movably mounted to the frame 16 to automatically move between a first position 24 where the carriage 18 is by a stack of glass sheets 13 on a glass rack 15, as shown in FIGS. 1 and 2, to a second position 26 where the carriage 18 is by the glass frame 14, as shown in FIGS. 3 and 4. The first gripper 20 is movably mounted to the carriage 18 and moves relative to the carriage 18 to automatically engage the sheet of glass 12 from the stack of glass sheets 13 on the glass rack 15 at the first position 24 of the carriage 18, as shown in FIGS. 1 and 2, and to automatically release the sheet of glass 12 at the second position 26 of the carriage 18, as shown in FIGS. 3 and 4. The second gripper 22 automatically engages the sheet of glass 12 when the first gripper 20 automatically releases the sheet of glass 12 at the second position 26 of the carriage 18, and then automatically places the sheet of glass 12 in the glass frame 14, as shown in FIGS. 3 and 4.

The apparatus 10 further comprises a table 28. The table 28 is pivotally mounted to the frame 16, and has the glass frame 14 resting thereon at an angle so as to prevent the sheet of glass 12 from falling out of the glass frame 14 when the second gripper 22 automatically places the sheet of glass 12 in the glass frame 14, as shown in FIGS. 3 and 4.

B. The Frame 16

The frame 16 comprises an initial inverted U-shaped member 30. The initial inverted U-shaped member 30 of the frame 16 comprises a pair of uprights 32 and an overhead transverse cross member 34. The pair of uprights 32 of the initial inverted U-shaped member 30 of the frame 16 extend upwardly from the floor 36, and are maintained spaced-apart from each other and parallel to each other by the overhead transverse cross member 34 of the initial inverted U-shaped member 30 of the frame 16.

The frame 16 further comprises a terminal inverted U-shaped member 38. The terminal inverted U-shaped member 38 of the frame 16 comprises a pair of uprights 40 and an overhead transverse cross member 42. The pair of uprights 40 of the terminal inverted U-shaped member 38 of the frame 16 extend upwardly from the floor 36, and are maintained spaced-apart from each other and parallel to each other by the overhead transverse cross member 42 of the terminal inverted U-shaped member 38 of the frame 16.

The frame 16 further comprises a pair of overhead axial cross members 44. The pair of overhead axial cross members 44 of the frame 16 space the terminal inverted U-shaped member 38 of the frame 16 downstream from and parallel to the initial inverted U-shaped member 30 of the frame 16. The pair of overhead axial cross members 44 of the frame 16 extend from the overhead transverse cross member 34 of the initial inverted U-shaped member 30 of the frame 16 to the overhead transverse cross member 42 of the terminal inverted U-shaped member 38 of the frame 16, and are maintained spaced-apart from each other a given distance and parallel to each other by their placement on the overhead transverse cross member 34 of the initial inverted U-shaped member 30 of the frame 16 and the overhead transverse cross member 42 of the terminal inverted U-shaped member 38 of the frame 16.

Each of the pair of uprights 32 of the initial inverted U-shaped member 30 of the frame 16, the overhead transverse cross member 34 of the initial inverted U-shaped member 30 of the frame 16, the pair of uprights 38 of the terminal inverted U-shaped member 38 of the frame 16, the overhead transverse cross member 42 of the terminal inverted U-shaped member 38 of the frame 16, and the pair of overhead axial cross members 44 of the frame 16 is a straight, slender, and elongated beam.

The frame 16 further comprises a pair of dampers 45. The pair of dampers 45 of the frame 16 are disposed on the pair of overhead axial cross members 44 of the frame 16, respectively, at the terminal inverted U-shaped member 38 of the frame 16, and decelerate the carriage 18 with the sheet of glass 12 therewith as the carriage 18 reaches the second position 26 of the carriage 18.

C. The Carriage 18

The carriage 18 comprises a pair of tracks 46. The pair of tracks 46 of the carriage 18 extend along and on top of the pair of overhead axial cross members 44 of the frame 16, respectively.

The carriage 18 further comprises a bridge 48. The bridge 48 of the carriage 18 extends transverse to and slides along the pair of tracks 46 of the carriage 18 by a first pair of sliders 50 depending from the bridge 48 of the carriage 18 and slidably engaging the pair of tracks 46 of the carriage 18, respectively.

The carriage 18 further comprises a first pair of slave cylinders 52. The first pair of slave cylinders 52 of the carriage 18 operatively connect the first pair of sliders 50 of the carriage 18 to the pair of tracks 46 of the carriage 18 so as to allow the carriage 18 to automatically move along the pair of overhead axial cross members 44 of the frame 16, between the first position 24 where the carriage 18 is by the stack of glass sheets 13 on the glass rack 15 to the second position 26 where the carriage 18 is by the glass frame 14.

The carriage 18 further comprises a second pair of slave cylinders 54. The second pair of slave cylinders 54 of the carriage 18 extend upright to and slide vertically along the bridge 48 of the carriage 18 by a second pair of sliders 56 extending from the bridge 48 of the carriage 18 and engaging the second pair of slave cylinders 54 of the carriage 18.

The carriage 18 further comprises a first pair of spacer bars 58. The first pair of spacer bars 58 of the carriage 18 are parallel to each other, spaced-apart from each other, and extend transversely between the second pair of slave cylinders 54 of the carriage 18 to maintain the second pair of slave cylinders 54 of the carriage 18 parallel to each other.

The carriage 18 further comprises an upper extension bar 60. The upper extension bar 60 of the carriage 18 is attached juxtaposed to a lower one of the first pair of spacer bars 58 of the carriage 18 by first screws 62, and extends outwardly past both ends 64 of the lower one of the pair of spacer bars 58 of the carriage 18.

The carriage 18 further comprises a pair of height-adjusting bars 66. The pair of height-adjusting bars 66 of the carriage 18 have lower ends 68 that are attached to the first gripper 20 by second screws 70.

The pair of height-adjusting bars 66 of the carriage 18 are parallel to each other and spaced-apart from each other so as to extend adjustably upright from both ends 69 of the upper extension bar 60 of the carriage 18 by third screws 72 passing through slots 74 in the pair of height-adjusting bars 66 of the carriage 18 so as to allow height adjustment of the first gripper 20 to accommodate the sheet of glass 12 of different heights by adjusting the pair of height-adjusting bars 66 of the carriage 18 relative to the upper extension bar 60 of the carriage 18.

The carriage 18 further comprises a second spacer bar 76. The second spacer bar 76 of the carriage 18 extends transversely between upper ends 78 of the pair of height-adjusting bars 66 of the carriage 18 to maintain the pair of height-adjusting bars 66 of the carriage 18 parallel to each other.

The carriage 18 further comprises a pair of limit sensors 77. The pair of limit sensors 77 of the carriage 18 are disposed on opposite extremes 79 of the second pair of slave cylinders 54 of the carriage 18, and limit vertical travel of the first gripper 20 between the first position 24 of the carriage 18 where the first gripper 20 automatically engages the sheet of glass 12 from the stack of glass sheets 13 on the glass rack 15 to the second position 26 of the carriage 18 where the first gripper 20 automatically releases the sheet of glass 12 into the glass frame 14.

D. The First Gripper 20

The first gripper 20 comprises a lower extension bar 80. The lower extension bar 80 of the first gripper 20 extends transversely between and is attached by the second screws 70 to the lower ends 68 of the pair of height-adjusting bars 66 of the carriage 18 so as to be parallel to the upper extension bar 60 of the carriage 18.

The first gripper 20 further comprises a pair of arms 84. The pair of arms 84 of the first gripper 20 are parallel to each other, spaced-apart from each other, and depend from the lower extension bar 80 of the first gripper 20.

The first gripper 20 further comprises a mounting bar 86. The mounting bar 86 of the first gripper 20 is parallel to the lower extension bar 80 of the first gripper 20 and extends transversely between and past lower ends 88 of the pair of arms 84 of the first gripper 20.

The first gripper 20 further comprises two first pair of suction cups 90. Each first pair of suction cups 90 of the first gripper 20 extend from ends 92 of the mounting bar 86 of the first gripper 20, respectively, face towards the stack of glass sheets 13 on the glass rack 15, automatically engage the sheet of glass 12 at the first position 24 of the carriage 18, and automatically release the sheet of glass 12 at the second position 26 of the carriage 18.

The first gripper 20 further comprises a first sensor 91. The first sensor 91 of the first gripper 20 is disposed on the lower extension bar 80 of the first gripper 20, faces the stack of glass sheets 13 on the glass rack 15, and stops traversing of the carriage 18 and starts vacuum on the two first pair of suction cups 90 of the first gripper 20 when the first gripper 20 reaches the stack of glass sheets 13 on the glass rack 15.

E. The Table 28

The table 28 comprises a peripheral frame 93.

The table 28 further comprises a sub-frame 94.

The sub-frame 94 of the table 28 comprises a base 96. The base 96 of the sub-frame 94 of the table 28 is disposed on the floor 36.

Figure 5:
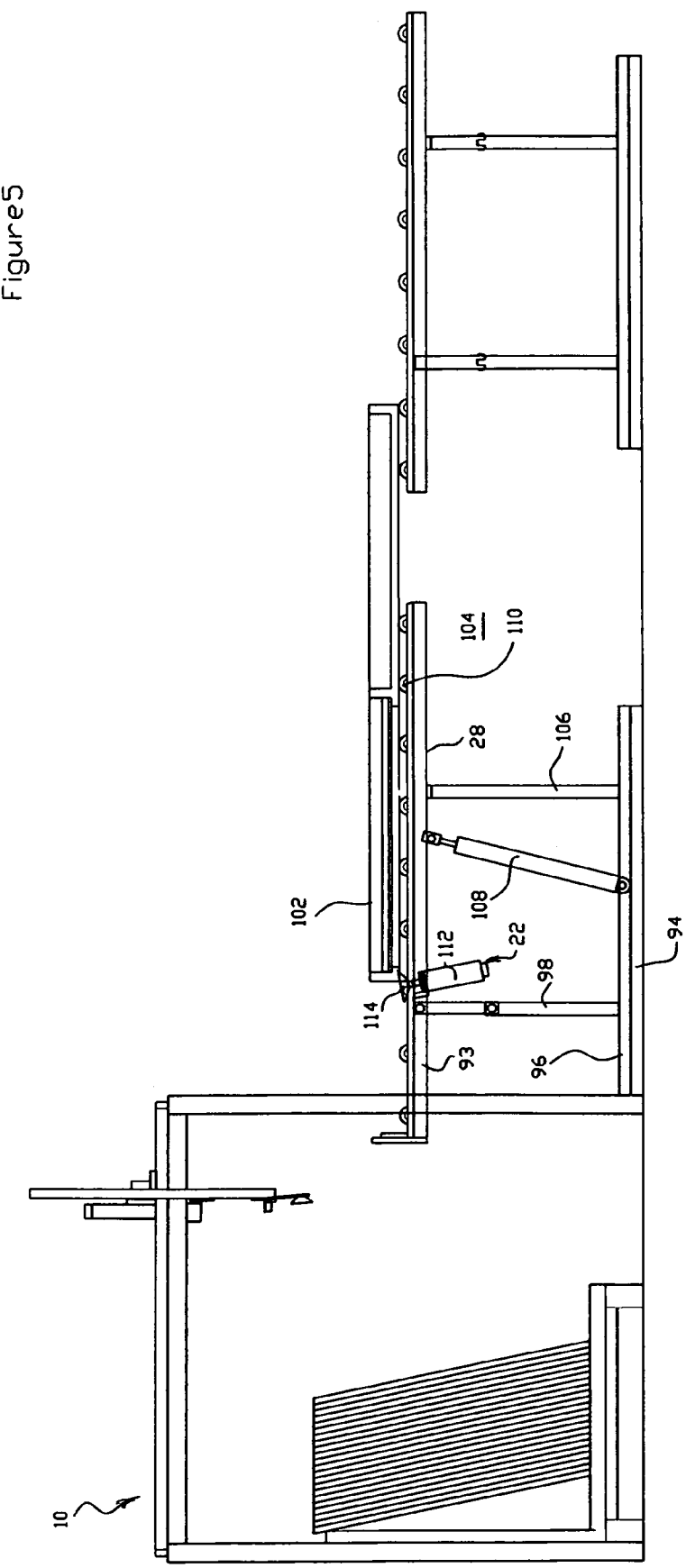
FIG. 5 is a diagrammatic side elevational view of the glassed frame being transferred from the table to the next station for further processing.
Figure 6:
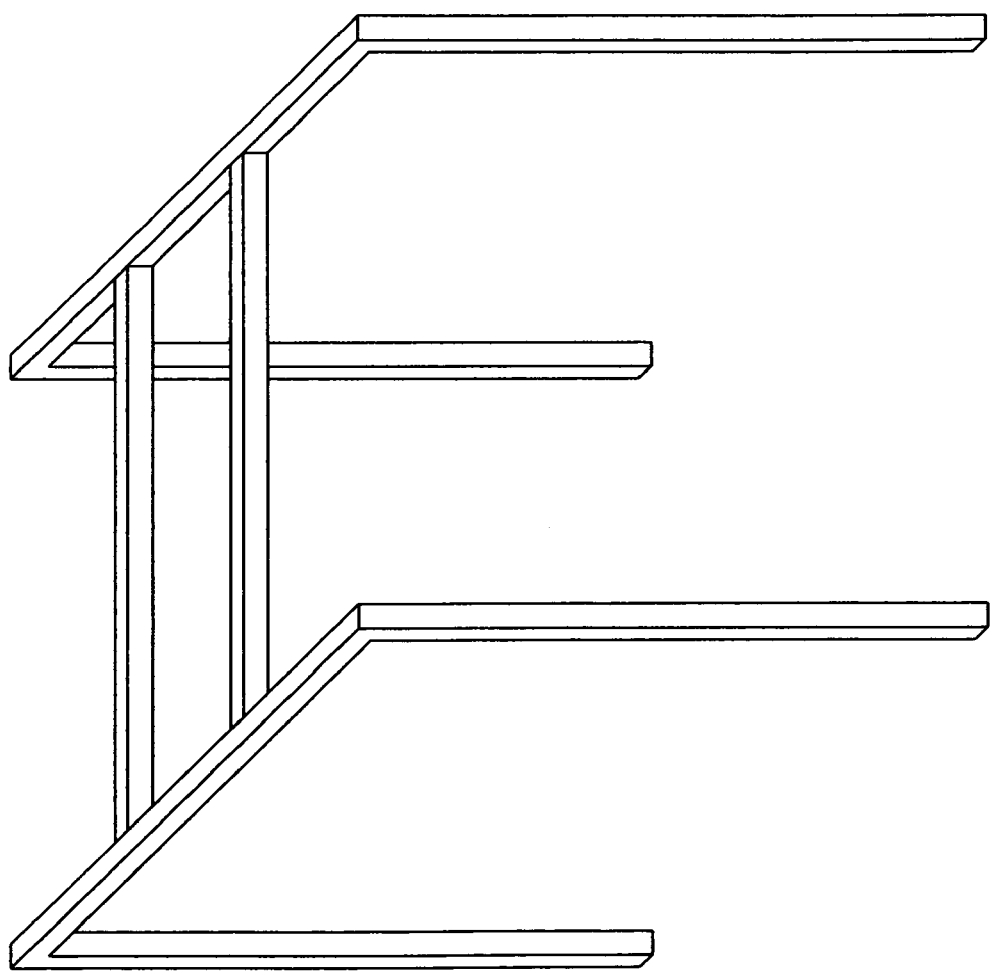
FIG. 6 is a diagrammatic three-dimension view of the frame of the apparatus of the present invention.

The sub-frame 94 of the table 28 comprises a pair of folding legs 98. The pair of folding legs 98 of the sub-frame 94 of the table 28 are parallel to each other, spaced-apart from each other, and extend upwardly from the base 96 of the sub-frame 94 of the table 28to the peripheral frame 93 of the table 28 so as to allow the table 28 to pivot between a first position 100 where the glass frame 14 is resting thereon at an angle so as to prevent the sheet of glass 12 from falling out of the glass frame 14 when the second gripper 22 automatically places the sheet of glass 12 in the glass frame 14 so as to form a glassed frame 102 to a second position 104 where the table 28 pivots horizontally so as to allow the glassed frame 102 to be slide thereof and be transferred to a next station for further processing. See FIG. 5, which is a diagrammatic side elevational view of the glassed frame being transferred from the table to the next station for further processing.

The sub-frame 94 of the table 28 further comprises a pair of rigid legs 106. The pair of rigid legs 106 of the sub-frame 94 of the table 28 are parallel to each other, spaced-apart from each other, and extend upwardly from the base 96 of the sub-frame 94 of the table 28, downstream from the pair of folding legs 98 of the sub-frame 94 of the table 28,so as to allow the peripheral frame 93 of the table 28 to rest horizontally thereon when the table 28 is in the second position 104 thereof.

The table 28 further comprises a third slave cylinder 108. The third slave cylinder 108 of the table 28 extends from the base 96 of the sub-frame 94 of the table 28 to the peripheral frame 93 of the table 28, between the pair of folding legs 98 of the sub-frame 94 of the table 28 and the pair of rigid legs 106 of the sub-frame 94 of the table 28, so as to allow the table 28 to pivot between the first position 100 thereof and the second position 104 thereof.

The table 28 further comprises conveyor rollers 110. The conveyor rollers 110 of the table 28 extend transversely across the peripheral frame 93 of the table 28 so as to facilitate sliding the glassed frame 102 off the table 28 and transferred to the next station for further processing.

F. The Second Gripper 22

The second gripper 22 comprises a fourth pair of slave cylinders 112. The fourth pair of slave cylinders 112 of the second gripper 22 are disposed on the table 28 to pivot therewith.

The second gripper 22 further comprises a second pair of suctions cups 114. The second pair of suction cups 114 of the second gripper 22 are disposed on the fourth pair of slave cylinders 112 of the second gripper 22, respectively, and automatically engage the sheet of glass 12 when the fourth pair of slave cylinders 112 of the second gripper 22 are automatically extended and the first gripper 20 automatically releases the sheet of glass 12 at the second position 26 of the carriage 18, and then the fourth pair of slave cylinders 112 of the second gripper 22 automatically place the sheet of glass 12 in the glass frame 14 when the fourth pair of slave cylinders 112 of the second gripper 22 are automatically retracted.

G. Conclusion

It will be understood that each of the elements described above or two or more together may also find a useful application in other types of constructions differing from the types described above.

While the invention has been illustrated and described as embodied in an apparatus and method for automatically placing a sheet of glass in a glass frame, however, it is not limited to the details shown, since it will be understood that various omissions, modifications, substitutions, and changes in the forms and details of the device illustrated and its operation can be made by those skilled in the art without departing in any way from the spirit of the present invention.

Without further analysis the foregoing will so fully reveal the gist of the present invention that others can by applying current knowledge readily adapt it for various applications without omitting features that from the standpoint of prior art fairly constitute characteristics of the generic or specific aspects of the invention.

The invention claimed is:

1. A glass sheet unstacking apparatus for automatically unstacking a sheet from a stack and moving the sheet to a glass frame, comprising:
   a) a rack supporting the stack of sheets, wherein the sheets are vertically oriented on the rack;
   b) a frame assembly comprising:
      i. a table pivotally mounted to a frame, wherein said table supports and pivots the glass frame between a horizontal orientation and an angled orientation, wherein the sheet is placed in said glass frame when said table is in the angled orientation;
      ii. said table further comprising a sub-frame connected to a pair of parallel folding legs, wherein said parallel folding legs pivot said table between the angled orientation preventing the sheet of glass from falling out of the glass frame when the sheet is placed in the glass frame and the horizontal orientation wherein said table is pivoted downward to place the glass frame on a conveyor for transfer and further processing;
      iii. a third slave cylinder that connects said sub-frame to said frame for pivoting said table;
      iv. a pair of parallel horizontal overhead axial cross members supported on vertical supports;
      v. a pair of air dampers disposed on said pair of axial cross members, respectively;
      vi. a table gripper attached to and pivoting with said table for receiving glass at a glass receiving position and placement within the glass frame, wherein said table gripper further comprises a pair of suction cups connected to a pair of slave cylinders, wherein the pair of slave cylinders act to extend and retract the table gripper suctions cups towards and away from the glass sheet positioned adjacent the frame assembly, and for moving said the glass sheet once gripped into the frame;

c) a carriage assembly movable horizontally and vertically, wherein said carriage assembly comprises:

i. a first carriage moveable horizontally along a pair of horizontal tracks extending along said pair of horizontal overhead axial cross members, said first carriage including a first pair of sliders slidably engageable with said horizontal tracks and a first pair of slave cylinders for driving said first carriage horizontally between a first position adjacent the stack of glass sheets positioned on the rack and a second position adjacent the pivoting table, said first carriage further including a pair of vertical tracks;

ii. a bridge vertically movable relative to said first carriage along said pair of vertical tracks, said bridge further including a second pair of sliders slideably engageable with said pair of vertical tracks and a second pair of slave cylinders which drive said bridge vertically along said vertical tracks;

iii. a pair of limit sensors disposed on opposite extremes of said second pair of slave cylinders, said pair of limit sensors limit vertical travel;

iv. a first gripper assembly for unstacking, transferring and releasing the sheet wherein said first gripper further comprises at least a pair of suction cups that automatically engage and unstack the sheet of glass from the stack when said carriage is located at said first position, transfers while engaged to the sheet to the second position and automatically releases the sheet of glass at said second position of said carriage;

v. a second sensor facing the stack of sheets on the rack, said second sensor simultaneously stops traversing of said carriage and initiates vacuum of said first gripper suction cups as said first gripper reaches the stack of glass sheets;

d) a controller for synchronizing sensors with movement of the first carriage and the bridge, engagement and release of the glass sheet between first and second positions, and for synchronizing second gripper extension, engagement and retraction of said glass sheet at the second position, wherein the controller adjusts the vacuum of the first grippers to an off condition while adjusting the vacuum of the table grippers to an on condition; and e) wherein the table gripper extends to receive the sheet, automatically engages the transferred sheet when said carriage has moved to said second position simultaneously with release by the first gripper, and retracts sheet while engaged with the sheet into the glass frame, wherein said table pivots from the angled orientation to the horizontal orientation.

2. The apparatus of claim 1, where said frame further comprises a terminal inverted U-shaped member;

wherein said terminal inverted U-shaped member of said frame comprises a pair of uprights and an overhead transverse cross member having a middle;

wherein said pair of uprights of said terminal inverted U-shaped member of said frame extend upwardly from the floor;

wherein said pair of uprights of said terminal inverted U-shaped member of said frame are maintained space-apart from each other by said overhead transverse cross member of said terminal inverted U-shaped member of said frame; and wherein said pair of uprights of said terminal inverted U-shaped member of said frame are maintained parallel to each other by said overhead transverse cross member of said terminal inverted U-shaped member of said frame.

3. The apparatus of claim 2, wherein said frame comprises a pair of overhead axial cross members;

wherein said pair of overhead axial cross members of said frame space said terminal inverted U-shaped member of said frame downstream from said initial inverted U-shaped member of said frame;

wherein said pair of overhead axial cross members of said frame space said terminal inverted U-shaped member of said frame parallel to said initial inverted U-shaped member of said frame;

wherein said pair of overhead axial cross members of said frame extend from near the middle of said overhead transverse cross member of said initial inverted U-shaped member of said frame to said overhead transverse cross member of said terminal inverted U-shaped member of said frame;

wherein said pair of overhead axial cross members of said frame are spaced-apart from each other a given distance by their placement on said overhead transverse cross member of said initial inverted U-shaped member of said frame and said overhead traverse cross member of said terminal inverted U-shaped member of said frame; and wherein said pair of overhead axial cross members of said frame are maintained parallel to each other by their placement on said overhead transverse cross member of said initial inverted U-shaped member of said frame and said overhead transverse cross member of said terminal inverted U-shaped member of said frame.

4. The apparatus of claim 3, wherein said carriage comprises a first pair of spacer bars;

wherein said first pair of spacer bars of said carriage are parallel to each other;

wherein said first pair of spacer bar of said carriage are spaced-apart from each other; and wherein said first pair of spacer bars of said carriage extend transversely between said second pair of slave cylinders of said carriage to maintain said second pair of slave cylinders of said carriage parallel to each other.

5. The apparatus of claim 4, wherein said carriage comprises an upper extension bar; and wherein said upper extension bar of said carriage is attached juxtaposed to a lower one of said first pair of spacer bars of said carriage.

6. The apparatus of claim 5, wherein said upper extension bar of said carriage extends outwardly past both ends of said lower one of said first pair of spacer bars of said carriage.

7. The apparatus of claim 6, wherein said carriage comprises a pair of height-adjusting bars;

wherein said pair of height-adjusting bars of said carriage have lower ends; and wherein said lower ends of said pair of height-adjusting bars of said carriage are attached to said first gripper.

8. The apparatus of claim 7, wherein said upper extension bar of said carriage has ends;

wherein said pair of height-adjusting bars of said carriage are parallel to each other; and wherein said pair of height-adjusting bars of said carriage are spaced-apart from each other so as to extend adjustably upright from said ends of said upper extension bar of said carriage, respectively.

9. The apparatus of claim 8, wherein said pair of height-adjusting bars of said carriage extend adjustably upright from said ends of said upper extension bar of said carriage, respectively, by fastening screws passing through slots in said pair of height-adjusting bars of said carriage so as to allow height adjustment of said first gripper to accommodate the sheet of glass of different heights by adjusting said pair of height-adjusting bars of said carriage relative to said upper extension bar of said carriage.

10. The apparatus of claim 7, wherein said carriage comprises a second spacer bar;
wherein said pair of height-adjusting bars of said carriage have upper ends; and
wherein said second spacer bar of said carriage extends transversely between said upper ends of said pair of height-adjusting bars of said carriage to maintain said pair of height-adjusting bars of said carriage parallel to each other.

11. The apparatus of claim of 1, wherein said table has a top;
wherein said top of said table is a rigid wood surface;
wherein said table comprises conveyors rollers; and
wherein said conveyor rollers of said table extend transversely across said peripheral frame of said table so as to facilitate sliding the glassed frame off said table and be transferred to the next station for further processing.

* * * * *